United States Patent Office 3,342,776
Patented Sept. 19, 1967

3,342,776
METHOD OF PREPARING AQUEOUS ALKALINE PHENOL-ALDEHYDE CONDENSATES
Alan L. Lambuth, Bellevue, Wash., assignor to Monsanto Company, St. Louis, Mo., a corporation of Delaware
No Drawing. Filed Sept. 21, 1966, Ser. No. 580,861
5 Claims. (Cl. 260—57)

ABSTRACT OF THE DISCLOSURE

This application pertains to highly reactive water-soluble phenol-formaldehyde condensates useful in adhesive formulations. The improved condensates are uniquely prepared in a two step process wherein initially a precursor or building block highly methylolated phenol structure is produced under reaction conditions which prevent the formulation of condensates but reduce the free-formaldehyde level to within a minimum value and then reacting these structures at elevated temperatures to obtain a resin having a viscosity of at least 100 centipoises at 70° F.

---

This invention is a continuation-in-part of that claimed in copending application, S.N. 192,048, filed May 3, 1962 now abandoned. It relates to novel aqueous alkaline phenol-formaldehyde condensates. More particularly, it relates to a highly reactive class of water-soluble thermosettable condensates of phenol and formaldehyde.

Aqueous alkaline phenol-formaldehyde and resorcinol-formaldehyde condensates are commonly employed in the manufacture of adhesive formulations for use in the preparation of plywood, laminated wood, hardboard, chipboard, etc.

Resorcinol-formaldehyde liquid resins provide what are undoubtedly the finest all-purpose, all-weather adhesives for wood available at the present time. They cure easily, hot or cold, using conventional radiant or radio frequency heating energy. Their assembly time tolerance is excellent and they have the ability to penetrate and bond difficult species of wood readily. However, their high cost has precluded their utilization except in critical applications where these special properties are necessary despite the premium prices which must be charged.

These desirable performance properties of resorcinol resins are generally attributed to their low average molecular weight coupled with a high order of reactivity. The low molecular weight permits thorough penetration into wooden adherends and adequate flow for long assembly times. The high reactivity more than offsets the curing disadvantage of this small initial polymer size, delivering a complete and rapid cure. In addition, the threshold temperature required for curing resorcinol resins is at or near room temperature.

By comparison, present aqueous phenol-formaldehyde adhesive resins which are low enough in cost to have widespread application in the wood industry are subject to severe operating limitations, based on their physical properties:

First, they have a high threshold temperature requirement for permanent cure.

Second, they are generally unsuitable for radio frequency curing due to low reactivity and excessive electrolyte content.

Third, in order to obtain any reasonable level of curing speed, their average molecular weight must be increased by preliminary condensation to the point where adequate penetration into wooden adherends is all but lost.

Fourth, conversely, if phenolic resins of low molecular weight are desired for purposes of thorough penetration, time and temperature curing requirements become clearly excessive.

Fifth, on wooden adherands, these resins have definite heating rate or temperature gradients limitations. If the rate of temperature increase is not maintained above a certain level, their aqueous medium is fluidized and absorbed into the dry cellulose faster than the polymer develops gel strength, resulting in a glue bond which is hardened by dehydration but not cured. On subsequent exposure to water, the glue line will soften and swell, if not dissolve. Because of this fact, phenolic resins cannot be cured at any appreciable distance from a heated surface. Their high threshold temperature requirements generally preclude the use of preheated stock as an answer to this shortcoming.

In the current wide use, are such phenol-formaldehyde resins as those exemplified in U.S. Letters Patent Redfern Re. 23,347, Stephan et al. 2,437,981 and Van Epps 2,360,376. Such resins are particularly suited to the manufacture of exterior grades of plywood by reason of their particular resistance to moisture. These resins suffer from the disadvantages specified above and have the further disadvantage that only good grades of plywood veneers may be used in conjunction therewith. Plywood mills frequently find themselves with large inventories of over-dried veneers, i.e., Douglas fir veneers, which due to a change in the chemical structure of the surface cells, cannot be satisfactorily laminated with these conventional phenolic adhesives.

Accordingly, it is an object of this invention to provide aqueous alkaline phenol-formaldehyde resins of high reactivity, and thus high speed of cure, when compared with the conventional resins of today.

Another object is the provision of aqueous alkaline phenol-formaldehyde resins of high reactivity and speed of cure, yet which are low enough in molecular weight to provide thorough penetration of wooden adherends.

Another object is the provision of aqueous alkaline phenol-formaldehyde resins suitable for radio frequency curing.

Another object is the provision of aqueous alkaline phenol-formaldehyde resins having threshold temperatures for permanent cure approaching more closely than heretofore considered possible those of resorcinol-formaldehyde resins.

Another object is the provision of an aqueous alkaline phenol-formaldehyde resin which may b eused in the lamination of overdried veneers to produce plywood of performance comparable to that of plywood produced from high grade veneers.

These and other objects are attained by (a) contacting phenol and formaldehyde in aqueous media and in critical proportions in the presence of a critical proportion of an inorganic alkaline catalyst at temperatures of from about 100-165° F. until substantially the minimum free formaldehyde level is obtained and (b) further reacting the product of (a) at elevated temperatures of from about 175° F. to reflux until a 70° F. viscosity of at least 100 centipoises is attained.

The following examples are presented in illustration of the invention and are not intended as limitations thereof. Where parts are mentioned, they are parts by weight, unless otherwise stated.

EXAMPLE I

Part A

Preparation of a precursor aqueous phenol-formaldehyde condensate

| Ingredients | Parts | Approximate Molar Proportion |
|---|---|---|
| Phenol | 900 | 1.0 |
| 37% formalin containing about 1% methanol by weight | 2,045 | 2.6 |
| Water | 980 | |
| 50% aqueous NaOH solution | 310 | 0.4 |
| | 4,235 | |

The phenol, formalin, water and caustic are charged to a stirred reactor and the reaction mixture is heated gently until an exothermic reaction starts which rapidly carries the reaction temperature to about 150° F. The reaction temperature is maintained at a temperature of from 145 to 150° F. until substantially the minimum free formaldehyde content of the reaction mixture is reached (ca. 1.0% based upon total resin; reached in ca. 5 hours). At this point, the reaction mixture is cooled to about room temperature. The resin obtained has a 70° F. viscosity of about 17 centipoises and contains about 38% actual solids by weight. These solids are essentially low-molecular weight but highly methylolated "building blocks" having an average ring number of about 2.3 and possessed of very high reactivity.

Part B

| Ingredients | Parts | Approximate Molar Proportion | | |
|---|---|---|---|---|
| | | P | F | Cat. |
| Precursor of Part A of Ex. I | 4,235 | 1.0 | 2.6 | 0.4 |
| 50% aqueous NaOH solution | 220 | | | 0.3 |
| Totals | 4,455 | 1.0 | 2.6 | 0.7 |

In this step, a condensation reaction between "building block" units of the precursor resin is effected to build higher, but still relatively low, molecular weight (as opposed to conventional resins of the Redfern, Van Epps, Stephan type) resins of high reactivity. The precursor phenol-formaldehyde condensate is heated to reflux temperature (ca. 215° F.) in a stirred reactor and is maintained thereat for about 30 minutes. The reaction mixture is then cooled to about 175 to 180° F. and is maintained thereat until a 70° F. viscosity of about 72,000 centipoises is attained. The caustic is then added and the reaction temperature is adjusted to about 160° F. and is maintained thereat until a 70° F. viscosity of about 370 centipoises is attained. At this point, the reaction mixture is rapidly cooled to about room temperature. The resulting aqueous alkaline phenol-formaldehyde condensate contains about 3.5% free formaldehyde, based upon total resin, and has a 180° F. gel time of about 820 seconds.

EXAMPLE II

| Ingredients | Parts | Approximate Molar Proportion | | |
|---|---|---|---|---|
| | | P | F | Cat. |
| Precursor of Part A of Ex. I | 4,100 | 1.0 | 2.6 | 0.4 |
| Phenol | 85 | 0.1 | | |
| 50% aqueous NaOH solution | 75 | | | 0.1 |
| Totals | 4,260 | 1.1 | 2.6 | 0.5 |

In this step, a condensation reaction between "building block" units of the precursor resin is effected to build higher, but still relatively low, molecular weight (as opposed to conventional resins of the Redfern, Van Epps, Stephan type) resins of high reactivity. The precursor phenol-formaldehyde condensate and the phenol are mixed in a stirred reactor, heated to reflux temperature (ca. 215° F.) and are maintained thereat for about 30 minutes. The reaction mixture is then cooled to about 175 to 180° F. and is maintained thereat until a 70° F. viscosity of about 970 centipoises is attained. The caustic is then added and the reaction mixture is rapidly cooled to about room temperature. The resulting aqueous alkaline phenol-formaldehyde condensate contains about 2% free formaldehyde, based upon total resin, and has a 180° F. gel time of about 2300 seconds.

EXAMPLE III

Part A

Preparation of a precursor aqueous phenol-formaldehyde condensate.

| Ingredients | Parts | Approximate Molar Proportion |
|---|---|---|
| Phenol | 5,480 | 1.0 |
| 37% aqueous formalin containing about 1% methanol by weight | 11,810 | 2.5 |
| Water | 3,740 | |
| 50% aqueous NaOH solution | 1,650 | 0.35 |
| | 22,680 | |

The phenol, formalin, water and caustic are charged to a stirred reactor and the reaction temperature adjusted to about 160° F. The reaction mixture is maintained at a temperature of from 150 to 160° F. until substantially the minimum free formaldehyde content of the reaction mixture is reached (ca. 1.1% based upon total resin; reached in ca. 2.5 hours). At this point, the reaction mixture is cooled to about room temperature. The resin obtained has a 70° F. viscosity of about 20 centipoises and contains about 40% actual solids by weight. These solids are essentially low-molecular weight but highly methylolated "building blocks" possessed of very high reactivity.

Part B

| Ingredients | Parts | Approximate Molar Proportion | | |
|---|---|---|---|---|
| | | P | F | Cat. |
| Precursor of Part A of Ex. III | 4,060 | 1.0 | 2.5 | 0.35 |
| 50% aqueous NaOH solution | 260 | | | 0.35 |
| Totals | 4,320 | 1.0 | 2.5 | 0.70 |

In this step, a condensation reaction between "building block" units of the precursor resin is effected to build higher, but still relatively low, molecular weight (as opposed to conventional resins of the Redfern, Van Epps, Stephan type) resins of high reactivity. The precursor phenol-formaldehyde condensate is heated to reflux temperature (ca. 215° F.) in a stirred reactor and is maintained thereat for about 20 minutes. The reaction mixture is then cooled to about 175 to 180° F. and is maintained thereat until a 70° F. viscosity of about 33,000 centipoises is attained. The caustic is then added and the reaction mixture is rapidly cooled to about room temperature. The resulting aqueous alkaline phenol-formaldehyde condensate contains about 3.5% free formaldehyde, based upon total resin, and has a 180° F. gel time of about 1800 seconds.

The following Example IV is exemplary of the conventional Redfern, Van Epps, Stephan type resin and is provided for the purposes of comparison to demonstrate the significantly lower reactivity as evidenced by 180° F. gel time, of a typical exterior grade plywood phenolic resin in widespread current use. The difference in results is attributable to the high initial temperature which prevents any significant development of the highly reactive precursor resin (building blocks) of step (a) of the present invention by favoring rapid, hetergeneous polymer growth through condensation without achieving substantial methylolation.

EXAMPLE IV

| Ingredients | Parts | Approximate Molar Proportion |
| --- | --- | --- |
| Phenol | 565 | 1.0 |
| 37% aqueous formalin containing about 1% methanol by weight | 985 | 2.0 |
| Water | 575 | |
| 50% aqueous NaOH solution (1) | 70 | 0.15 |
| 50% aqueous NaOH solution (2) | 145 | 0.3 |
| 50% aqueous NaOH solution (3) | 145 | 0.3 |
| | 2,485 | |

The phenol, formalin, water and first caustic are charged to a stirred reactor and the reaction mixture is heated to reflux temperature (ca. 215° F.) over a period of about 20 minutes. The reaction mixture is maintained at reflux temperature for about 30 minutes and is then rapidly cooled to about 180° F., at which temperature it is maintained until a 70° F. viscosity of about 87,000 centipoises is attained. The second caustic is then added and the reaction continued at about 180° F. until the next 70° F. viscosity end-point of about 30,000 centipoises is attained. The third caustic is then added and the reaction mixture is rapidly cooled to about room temperature. The resulting aqueous alkaline phenol-formaldehyde condensate is substantially free of free formaldehyde and has a 180° F. gel time of about 4100 seconds.

The manufacture of the aqueous alkaline phenol-formaldehyde condensates of this invention is best considered in two stages. The first stage being the manufacture of a precursor resin at low temperature and the second stage constituting the bodying of that precursor resin at elevated temperatures.

The formaldehyde employed may be substantially pure or it may be a commercially available aqueous solution thereof. Commercial formalin, i.e., aqueous solutions of formaldehyde, usually contains a small proportion of methanol to stabilize the formaldehyde against polymerization to paraformaldehyde in storage or in transit. Methanol-free formalin is available and may be used. However, up to about 6% methanol by weight, based upon the total weight of the formalin, may be present. At higher methanol content, the reactivity of the formaldehyde rapidly decreases resulting in excess of reaction times in attaining each desired end-point during the reaction. In the process of this invention from 2.2 to 3.5 molar proportions of formaldehyde per molar proportion of phenol are employed.

The phenol employed need not be chemically pure. Commercial grade phenol containing up to 15% by weight of conventional impurities such as resorcinols, cresols, xylenols, stillbottoms or phenyl phenols, water, etc., may be and is most commonly employed.

The inorganic alkaline catalysts employed in the practice of this invention are selected from the group consisting of alkaline earth and alkali metal hydroxides, oxides and salts of weak acids. However, preferably the alkaline earth salts of weak acids are used only in the preparation of the precursor resins, since the subsequent bodying of the precursor resin requires a catalyst of somewhat higher activity if reasonably short reaction times are to be attained. Thus, in those instances where the precursor resin is manufactured using an alkaline earth salt of a weak acid as catalyst, one of the stronger catalysts is preferably added prior to or during the bodying step. Thus, in addition to the sodium hydroxide, calcium hydroxide, sodium carbonate, barium hydroxide and magnesium hydroxide employed in the examples, such other inorganic alkaline catalysts as potassium hydroxide, lithium hydroxide, sodium oxide, calcium oxide, cesium oxide, sodium phosphate, potassium carbonate, sodium acetate, lithium acetate, etc., may be used with equivalent results.

In the preparation of the precursor resin, the inorganic alkaline catalyst is employed in the proportion of from about 0.15 to 0.6 hydroxide equivalent proportions per molar proportion of phenol. In a preferred embodiment, the quantity of inorganic alkaline catalyst employed will bear a direct relationship to the proportion of formaldehyde employed. Thus, when about 2.2, 2.5 and 3.0 molar proportions of formaldehyde are employed, it is preferred to employ about 0.15 to 0.3, 0.3 to 0.4 and 0.5 to 0.6 hydroxyl equivalent proportions of the inorganic alkaline catalyst, respectively.

If desired, the bodying of the precursor resin can be accomplished without the further addition of inorganic alkaline catalyst. However, it is preferred to add at least 0.1 hydroxyl equivalent proportion of inorganic alkaline catalyst per molar proportion of phenol, either continuously or in one or more increments prior to, during, or at the completion of the bodying stage, up to a maximum of 1.0 hydroxyl equivalent proportions of inorganic alkaline catalyst, including that employed in the operation of the precursor resin. In such instance, the inorganic alkaline catalyst added should preferably be one or more from the group consisting of alkali metal hydroxides, oxides and salts of weak acids and alkaline earth hydroxides and oxides.

In the preparation of the precursor resin, the phenol, formaldehyde and the inorganic alkaline catalyst are combined within the prescribed proportions and the mixture is heated at a temperature of from about 100–165° F. until substantially, i.e., within about 10% of, the minimum free formaldehyde level of the reaction mixture is attained. For any given system and reaction conditions, the free formaldehyde level of the reaction mixture can be measured at regular intervals and plotted against time. It will be found that a reproducible curve will be obtained showing free formaldehyde dropping to a minimum level after which with continued reaction it will either remain level or actually rise slightly. The end-point of the first stage is measured as being withing 10% of this minimum, either on the approaching or after side. In order to give some indication of the absolute level of free formaldehyde at this end-point (but in no event to be considered as limiting since this is not the manner in which it is chosen to determine the end-point), free-formaldehyde levels of about 0.8 to 3.5% are most usually attained. The manufacture of this precursor resin is described in detail in applicant's copending application S.N. 192,055, filed as of May 3, 1962.

The precursor resin is subsequently bodied at a temperature of from about 175° F. to reflux temperature and more preferably at a temperature from 180° F. to reflux temperature. In its broadest scope, this stage of the resin preparation embodies reaction of the precursor at the prescribed temperature until a 70° F. viscosity of at least 100 centipoises is obtained. However, in a more preferred embodiment, as heretofore discussed in part, additional inorganic alkaline catalyst is added during this phase, either continuously or in one or more increments; up to a total of 1.0 hydroxyl equivalent proportions, including that employed in the preparation of the precursor resin.

The viscosity end-point of at least 100 centipoises specified above, to which the resins of this invention are bodied, provides resins of reactivity comparable to aqueous alkaline phenol-formaldehyde resins of the prior art, but of considerably lower molecular weight. Superior reactivity can be achieved through the use of a curing catalyst. At higher viscosity end-points, the resins increase in reactivity and also in molecular weight.

When multiple addition of the inorganic alkaline catalyst is employed in this bodying stage, each increment should not exceed 0.3 hydroxyl equivalent proportions per molar proportion of phenol and preferably should be in the range of from 0.15 to 0.25 hydroxyl equivalent proportions per molar proportion of phenol. In such instances, the reaction mixture should be bodied to a degree such that upon addition of each increment of inorganic alkaline catalyst, the reaction mixture will have a 70° F. viscosity of at least 50 centipoises. If desired, the inorganic alkaline catalyst may be added continuously or semi-continuously during this bodying stage, care being taken to charge the inorganic alkaline catalyst at a rate such that a 70° F viscosity of at least 50 centipoises is maintained. Such techniques are well within the experience and knowledge of those skilled in the phenolics resins art.

If desired, up to about 0.3 molar proportion of further phenol per molar proportion of phenol in the precursor, provided the relative molar proportion with respect to formaldehyde heretofore set forth is maintained, may be added prior to, during, or on the completion of the bodying stage. The free formaldehyde level, which is at substantially its minimum upon completion of the precursor resin, tends to increase during the bodying stage. If it should be desired to maintain the low free formaldehyde level of the precursor resin, or to further reduce the free formaldehyde level, or to achieve a controlled increase in free formaldehyde level, this expedient of adding further phenol in predetermined proportions will effectuate such results.

At this point, an important distinction between conventional resin preparations and the process of this invention should be noted. In a conventional resin preparation where full condensation to high molecular weight is embarked upon from the outset, the first charge of catalyst, although possibly within the proportion of the first stage (step (a)) of the present invention, coupled with temperatures above 175° F. is sufficient to cause condensation reactions to occur in preference to methylolation reactions, especially those involving the substitution of more than 1 methylol group onto each phenol ring. As a result, high levels of molecular weight are attained with little functionality.

On the other hand, in step (a) of the present invention, the preparation of the precursor resin involves inhibition of condensation reactions in the above sense. Rather, because of the gentle temperature conditions and the controlled proportion of catalyst, the condensation reaction is suppressed and methylolation is enhanced with the result being structural units of low average ring number essentially saturated with reactive methylol groups. The end-point of step (a) is measured in terms the degree of completeness of the reaction of the formaldehyde. Step (b), or the bodying stage, can, in one embodiment, be entered into by merely raising the temperature to about 175° F. or more where the condensation reaction is now favored. However, because of the associative bonding which can now also occur, it is preferred to charge additional increments of catalyst to destroy the viscosity build-up due to associative bonding and allow permanent condensation (methylene bridging) to higher molecular weights. However, the products of this invention usually have a considerably lower average molecular weight than do the conventional Redfern, Van Epps, Stephan type of resins.

The following examples illustrate the preparation of conventional exterior grade plywood adhesives and the evaluation thereof when used in the preparation of plywood from overdried Douglas fir veneers, comparing the performance of the resins of this invention with that of the typical commercially available plywood phenolic resin prepared in Example IV.

EXAMPLE V

Formulation of an aqueous exterior plywood adhesive

| Ingredients: | Parts |
| --- | --- |
| Water at room temperature | 105 |
| "Furafil" 100–s extender | 60 |
| 50% aqueous NaOH solution | 25 |
| Soda ash | 10 |
| Aqueous alkaline phonol-formaldehyde condensate | 500 |
| | 700 |

Aqueous exterior plywood adhesive formulations are prepared according to the above formula for each of the aqueous phenol-formaldehyde condensates prepared in Examples II and IV. In each formulation, first the water is charged to a mixer or blender and then the Furafil 100–s extender and the caustic are successively added, in that order, allowing a short mixing period (ca. 1–3 minutes) after each addition to achieve substantial homogeneity of the batch. The soda ash is then added and the batch is mixed for about 15 minutes. Finally, the aqueous alkaline phenol-formaldehyde condensate is added, the batch is mixed for about another 10 minutes, and the resulting adhesive formulation is ready for use.

The "Furafil" 100–s extender employed is a finely divided solid residue obtained by the acid hydrolysis of pentosan-containing materials, the use of which as a filler in phenolic adhesives is described in U.S. Patent No. 2,727,869. "Furafil" is a trademark of the Quaker Oats Company and 100–s refers to the particle size of the material, and also indicates it has been oiled to reduced dustiness.

The following Example VI and Table A illustrate the use of the two exterior plywood adhesive formulations prepared in Example V in the manufacture of exterior grade plywood from overdried Douglas fir veneers. Overdried veneers are chosen to more clearly demonstrate the advantages of the aqueous alkaline phenol-formaldehyde condensates of this invention in that such over dried veneers are most difficult to successfully laminate, as has hereinbefore been discussed.

EXAMPLE VI

Comparative evaluation of the adhesive compositions prepared in Example V:

(a) Five-ply 13/16" Douglas fir plywood panels are prepared using overdried Douglas fir veneers and using 60 pounds of adhesive per thousand square feet of double glue-line (MDGL) at assembly times as shown in Table A, hot-pressing the panels at 175 p.s.i. and 285° F. for 7½ minutes. Each panel is then tested for dry, wet and boil shear strength, measuring both the breaking load and the percent wood failure.

(b) Specimens for shear strength evaluation are prepared by first cutting a 3⅛" x 10" section from each panel; each section being cut so that the grain of the face plies is oriented parallel to the long axis. Each section is then grooved on one face along a line ½ inch from the long axis, and parallel thereto, to a depth extending ⅔ through the center ply. A second and similar groove is cut parallel thereto upon the opposite face of each section such that the distance between the grooves is exactly 1 inch. After grooving, each section is cut across the long axis to yield a number of specimens measuring 1" x 3⅛" and having a shear area of one square inch located in the center. For each of the dry, wet and boil shear test six of the specimens cut from each section are broken on the Hydraulic Plywood Testing Machine No. HC-455, manufactured by I. F. Laucks, Inc. and the average breaking load and percent failure for each set of 6 specimens is determined.

(c) The specimens to be tested for dry shear strength require no pretreatment. Those to be tested for wet shear strength are pretreated by soaking them in water at room temperature for 48 hours and are then broken while still wet. The specimens to be tested for boil shear strength are pretreated by immersing them in boiling water for 4 hours, drying them in a forced air oven at 145° F. for 20 hours, and finally immersing them in boiling water for another 4 hours. These specimens are also broken while still wet.

The test results for each adhesive are summarized in Table A. In interpreting these results, a wood failure of 0% indicates that failure occurs entirely within the glueline. Conversely, a wood failure of 100% indicates that the glue-line is uniformly stronger than the wood within the shear area of the center ply. Obviously, a plywood adhesive should show a high wood failure, at least on dry shear. Similarly, a water-resistant plywood adhesive should show appreciable wood failure on wet shear.

TABLE A

| Resin Employed | Assembly Time (Minutes) | Breaking Load (p.s.i.) and Percent Wood Failure | | |
|---|---|---|---|---|
| | | Dry Shear | Wet Shear | Boil Shear |
| Of Ex. II | 3 | 305 p.s.i., 75% | 225 p.s.i., 95% | 225 p.s.i., 90%. |
| Do | 10 | 260 p.s.i., 90% | 205 p.s.i., 95% | 210 p.s.i., 90%. |
| Do | 20 | 305 p.s.i., 90% | 230 p.s.i., 85% | 240 p.s.i., 90%. |
| Do | 30 | 310 p.s.i., 80% | 230 p.s.i., 85% | 210 p.s.i., 70%. |
| Do | 40 | 230 p.s.i., 90% | 180 p.s.i., 85% | 183 p.s.i., 90%. |
| Of Ex. IV | 3 | 235 p.s.i., 0% | 185 p.s.i., 15% | 170 p.s.i., 15%. |
| Do | 10 | 215 p.s.i., 50% | 165 p.s.i., 50% | 150 p.s.i., 65%. |
| Do | 20 | 238 p.s.i., 15% | 210 p.s.i., 35% | 165 p.s.i., 20%. |
| Do | 30 | 205 p.s.i., 10% | 177 p.s.i., 50% | 125 p.s.i., 30%. |
| Do | 40 | 228 p.s.i., 20% | 187 p.s.i., 25% | 150 p.s.i., 20%. |

Table A clearly demonstrates the deficiencies as represented by lack of bond strength of today's commercially available aqueous alkaline phenolic resins when employed in the lamination of overdried Douglas fir veneer. However, Table A further demonstrates the superiority, as compared therewith, of the aqueous alkaline phenolformaldehyde condensates of this invention.

The aqueous alkaline phenol-formaldehyde resins of this invention are unique in that they approximate the performance of resorcinol-formaldehyde resins. More particularly, in comparison with current available phenolic adhesive resins, the resins of this invention have been found to possess much lower average molecular weight for given levels of reactivity, thus permitting better penetration of adherends, particularly of those having cellular structure. Conversely, these resins possess much greater reactivity at molecular weights equivalent to those of conventional phenolic adhesive resins. They have also been found to be possessed of a greatly increased assay of methylol groups per polymer molecule, yielding stronger adhesion to cellulosic, and other, adherends through an increased density of hydrogen bonds. To further distinguish these resins, it has been found that their threshold temperature for permanent cure approaches that of resorcinol-formaldehyde resins more closely than any other phenolic resins now available.

Unlike conventional phenolic adhesive resins, the aqueous alkaline phenol-formaldehyde resins of this invention are readily cured by radio frequency heating techniques and by stored heat cold press laminating techniques. Of course, they are also readily cured by conventional hot pressing or oven heating.

The aqueous alkaline phenol-formaldehyde resins of this invention may be combined with conventional additives in the formulation of low cost, high speed adhesives for the manufacture of plywood or laminated wood or used alone or in admixtures in the manufacture of hardboard and chipboard. These conventional additives include filler, soda ash soluble silicates, ammonia, catalytic and hardening agents such as soluble salts of certain heavy metal acids, defoamers, proteins, resorcinol, poly-functional amines, phenol-resorcinol resins, polyepoxides, metacresol, melamine resins, aldehyde complexes and donors, buffer salts, dyes, etc. to provide special adhesive compositions particularly adapted for use in given applications. Similarly, materials such as carboxymethyl cellulose, hydroxyethyl cellulose, polyelectrolytes, polyolefins, polyesters, amylaceous materials, etc., may be added for control of flow, i.e., spreadability, penetration and viscosity. These resins also make excellent adhesives for paper, cardboard, cloth, etc., bonding such materials to themselves, to each other or to wood. In addition, these resins are excellent adhesives for many sheet and powdered metals, ceramic materials, inorganic particles and fibers, and thermoset plastics; bonding these materials to themselves, to each other, or to cellulosic materials. In use these adhesives may be applied either directly as liquids or spraydried powders, or indirectly in a wet or dry self-supporting film. As has been heretofore developed, the aqueous alkaline phenol-formaldehyde condensates of this invention are particularly advantageous in the preparation of laminates from over-dried veneers. However, it is not intended that the utility of these resins be limited to such applications since they are also highly desirable adhesives when used in conjunction with the higher grades of veneers. It has been found that these resins also can be used to satisfactorily bond wood which are ordinarily considered difficult to laminate, i.e., larch, Rocky Mountain fir, Ponderosa pine, Eastern birch, Eastern hard maple, mahogany, etc.

It is obvious that many variations may be made in the products and processes set forth above without departing from the spirit and scope of this invention.

What is claimed is:

1. A process for preparing a phenol-formaldehyde condensate in aqueous alkaline medium which comprises (a) co-reacting in aqueous media 1 molar proportion of phenol with from 2.2 to 3.5 molar proportions of formaldehyde in the presence of from 0.15 to 0.6 hydroxyl equivalent proportions of an inorganic alkaline catalyst at a temperature of from about 100 to 165° F. until a free formaldehyde level of within 10% of the minimum is attained, and (b) continuing the co-reaction of the phenol and formaldehyde at a temperature of from about 175° F. to reflux temperature until a 70° F. viscosity of at least 100 centipoises is attained; from zero to about 0.3 molar proportions of phenol being charged during step (b) provided the relative proportion of phenol to formaldehyde is maintained within the range specified in step (a) and from zero to 0.85 hydroxyl equivalent proportions of inorganic alkaline catalyst being charged during the interval starting with the completion of step (a) and ending with the completion of step (b) provided the total inorganic alkaline catalyst charged does not exceed about 1.0 hydroxyl equivalent proportion per molar proportion of total phenol charged; said inorganic alkaline catalyst being selected from the group consisting of alkali metal and alkaline earth hydroxides, oxides and salts of weak acids.

2. A process as in claim 1 wherein step (a) is conducted at a temperature of from about 140 to 165° F. and step (b) is conducted at a temperature of from about 180° F. to reflux temperature.

3. A process as in claim 2 wherein the inorganic alkaline catalyst is sodium hydroxide.

4. A process as in claim 1 wherein the inorganic alkaline catalyst charged during the interval starting with the completion of step (a) and ending with the completion of step (b) is charged continuously at a rate such as to maintain a 70° F. viscosity of at least 50 centipoises.

5. A process as in claim 1 wherein the inorganic alkaline catalyst charged during the interval starting with the completion of step (a) and ending with the completion of step (b) is charged in a plurality of increments of up to 0.3 hydroxyl equivalent proportion per molar proportion of total phenol charged such that upon the addition of each increment a 70° F. viscosity of at least 50 centipoises is maintained.

References Cited
UNITED STATES PATENTS

| | | | |
|---|---|---|---|
| 2,360,376 | 10/1944 | Van Epps | 260—57 |
| 2,437,981 | 3/1948 | Stephan | 260—57 |
| 2,457,493 | 12/1948 | Redfern | 260—57 |
| 3,223,667 | 12/1965 | Herrick et al. | 260—29.3 |

MURRAY TILLMAN, *Primary Examiner.*

J. C. BLEUTGE, *Assistant Examiner.*